INVENTOR.
HENRY B. COLE
BY James P. McAndrews
ATTORNEY

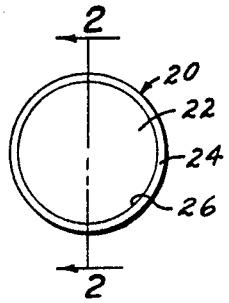
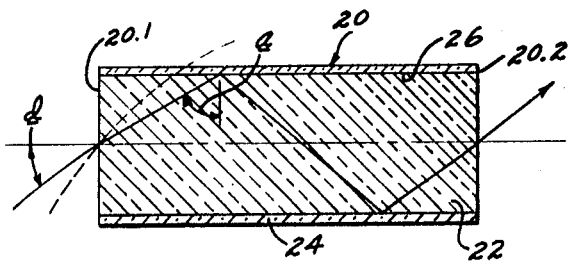
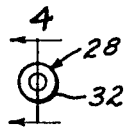
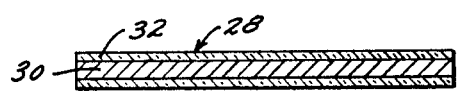
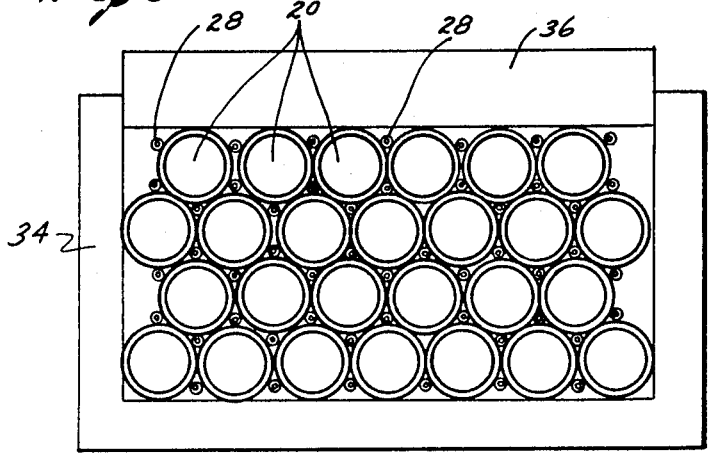

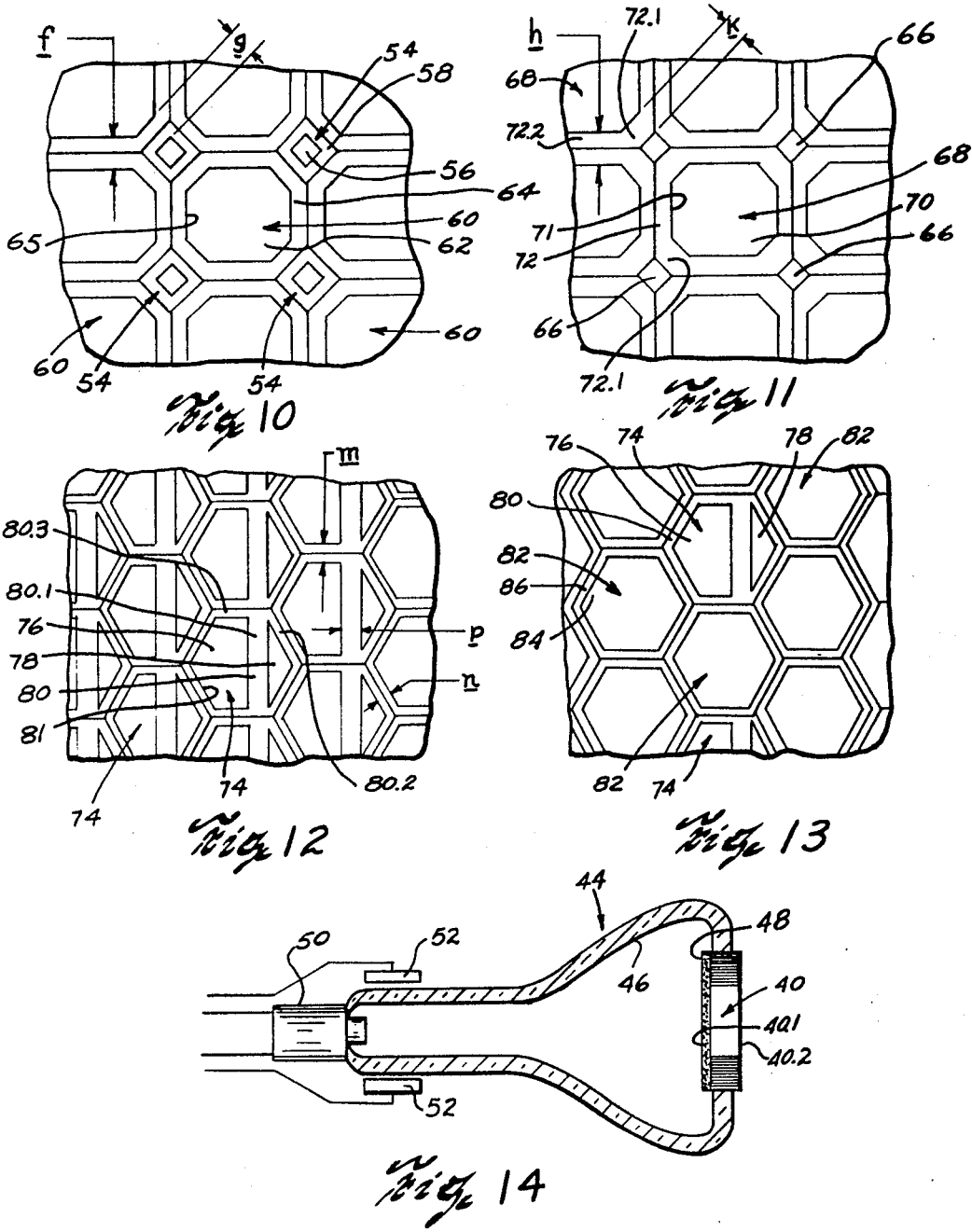

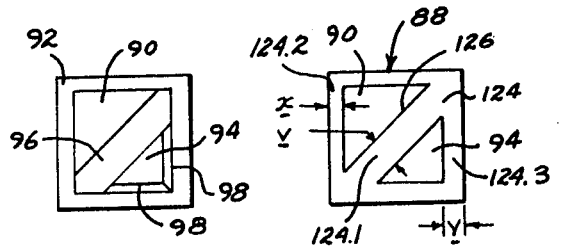
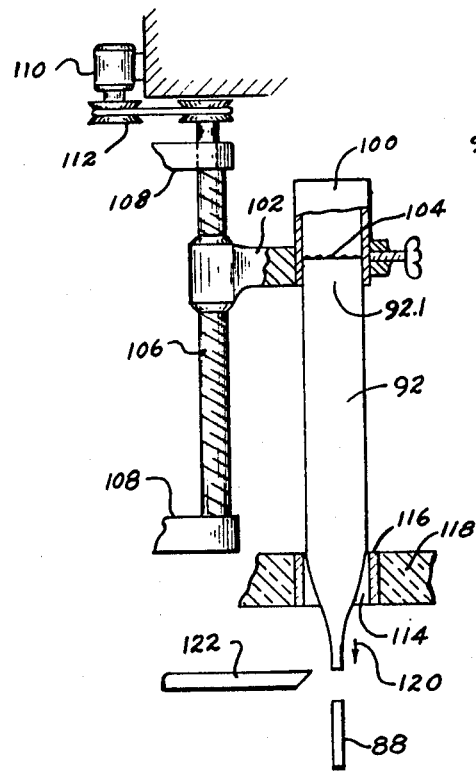
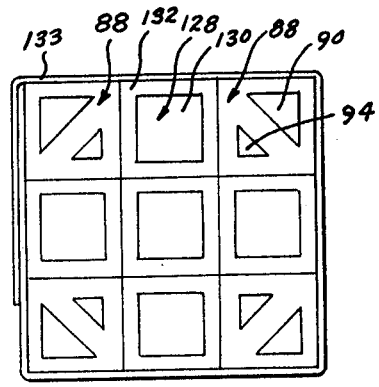
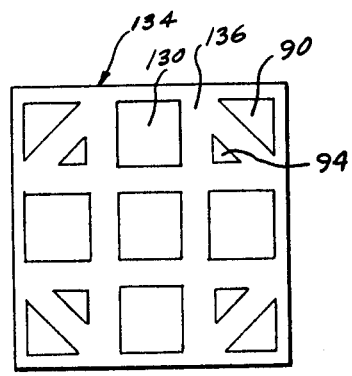

3,397,022
OPTICAL FIBERS AND FIBER OPTICAL IMAGE-TRANSFER DEVICES HAVING LIGHT ABSORBING ELEMENTS

Henry B. Cole, East Woodstock, Conn., assignor, by mesne assignments, to American Optical Company, Southbridge, Mass., a corporation of Delaware
Original application Nov. 19, 1962, Ser. No. 238,372, now Patent No. 3,387,959, dated June 11, 1968. Divided and this application Dec. 20, 1965, Ser. No. 553,582
3 Claims. (Cl. 350—96)

ABSTRACT OF THE DISCLOSURE

A fiber optical image-transfer device formed of a bundle of fibers of highly light-transmissive material and a number of interspersed elements of material having significant light-absorbing properties all interconnected in spaced side-by-side relationship with a minimum thickness of light-conducting matrix material between adjacent fibers which is substantially equal to the minimum thickness of cladding material between a fiber and any adjacent absorbing element and fibers having light-absorbing elements therein for use in making such devices.

---

This application is a division of applicant's copending application, Ser. No. 238,372, filed Nov. 19, 1962.

The field of this invention is that of fiber optical image-transfer devices and the invention relates more particularly to improvements in such devices and fibers for use in making the same In conventional fiber optical image-transfer devices a mutiplicity of optical fibers each having a core of light-transmitting material of relatively high index of refraction and a cladding of light-transmitting material of relatively low index of refraction are secured together in side-by-side bundled relation, usually by fusing the fiber claddings together, so that corresponding opposite ends of the fibers cooperate to define mosaic image-receiving and image-forming faces at respective opposite ends of the device. Each fiber core forms an interface with its cladding around the periphery of the core so that light received within the core at one end to be incident upon the interface at angles greater than the critical angle of reflection for the interface can be repeatedly reflected from the interface to be conducted through the fiber core and so that light received within the fiber core to be incident upon the fiber interface at angles smaller than said critical angle of reflection can be transmitted through the interface.

In this arrangement, a light image can be formed upon the image-receiving device face so that the various fibers defining that face can receive light within their cores from respective small segments of the light image and so that each fiber can conduct a relatively large part of the light received therein through its core by repeated reflection of the light from the fiber interface. The light thus conducted through respective fiber cores tends to reproduce the various light and dark segments of the light image with proper contrast therebetween upon the opposite, image-forming end face of the device, thereby to reproduce the overall light image in mosaic form. As each fiber core can reproduce a segment of the mosaic light image only as a light spot or dark spot, the image-transfer device must embody a great multiplicity of fiber cores of small cross-sectional size in order to reproduce the light image in mosaic form with suitably high image resolution. Further, in order to reproduce the light image in mosaic form with suitably high light intensities, each fiber core must be adapted to conduct a large part of the light received therein to the output end face of the device.

In conventional image-transfer devices of this character, however, other light received within the device fibers from the original light image will not be conducted through specific fiber cores and therefore will not contribute to the reproduction of particuar segments of the light image. For example, some light received within a fiber core at proper angles to be reflected from the fiber interface may be partially transmitted through the interface into immediately adjacent fibers as "cross-talk" between the fibers. Other light received within a fiber core can be incident upon the fiber interface at angles such that the light is almost completely transmitted through the interface to stray through various device fibers. Further, light from the original light image can enter directly into the fiber claddings rather than the fiber cores at the image-receiving device face and can also stray throughout the device. This stray light can reach the output end face of the image-transfer device at any random point so that it cannot contribute to image reproduction. Thus this stray light forms an undesirable background of light which tends to wash-out or reduce contrast between light and dark image segments reproduced on the output face of the device by light properly conducted through specific fiber cores. Various techniques have been employed in conventional fiber optical image-transfer devices in attempting to reduce the amount of stray background light which can reach the output end faces of the devices, but all such techniques previously known in the art have caused substantial reductions in the degree of resolution and in the brightness or intensity of light images transferred and reproduced by the devices.

It is an object of this invention to provide novel and improved fiber optical image-transfer devices; to provide such image-transfer devices which are adapted to transfer and reproduce light images with high image resolution; to provide such devices which are adapted to transfer and reproduce light images with relatively high light intensities; to provide such devices which are adapted to transfer and faithfully reproduce light images with true contrast between light and dark segments of the image; and to provide such devices which are of simple and inexpensive construction.

It is a further object of this invention to provide such improved fiber optical image-transfer devices in which a relatively large part of the light received within each fiber core from a segment of a light image at one end of the device is conducted through the fiber core for reproducing the image segment at the opposite end of the device; to provide such improved devices in which a substantial part of the stray light within the device is absorbed before it can reach the output end face of the device; and to provide such improved devices embodying a very large number of fiber cores of very small cross-sectional size in which the ends of said fiber cores cooperate to define opposite end faces of the devices and constitute a substantial proportion of the cross-sectional area of said end faces.

Briefly described, the image-transfer device of this invention comprises a multiplicity of fibers of a light-transmitting material of relatively high index of refraction, a multiplicity of light-absorbing filaments, and a matrix of a light-transmitting material of relatively low index of refraction. The fibers are secured in spaced side-by-side relation by the matrix material so that corresponding opposite ends of the fibers cooperate to define mosaic image-receiving and image-forming faces at respective opposite ends of the device. Each fiber forms a light-reflecting interface with the matrix material around the fiber periphery so that light received within the fiber from a light image formed upon the image-receiving device face can be repeatedly reflected from the interface to be conducted through the fiber, thereby to reproduce the light image in mosaic form on the image-forming device face.

According to this invention, the light-absorbing filaments are secured within the matrix material between the fibers so that they can intercept and absorb a substantial part of the unwanted stray light in the device, whereby the device can transfer and reproduce a light image in mosaic form with true contrast between light and dark segments of the image. Further the filaments are spaced at a selected distance from adjacent fiber interfaces so that the filaments do not tend to absorb image-forming light which is conducted through the adjacent fibers by reflection from the fiber interfaces. This means that the filaments do not interfere with light conduction by the fibers so that the device can transfer and reproduce bright light images with high light intensity. In addition, the fibers themselves are spaced by the matrix material at a distance from each other which does not substantially exceed the spacing of said fibers from adjacent light-absorbing filaments. Such controlled spacing of the fibers can minimize or prevent cross-talk between adjacent fibers but can permit the incorporation of a large number of very small fibers in the device, whereby a large proportion of the area of the device end faces can be made up of light-conducting fibers and only a small proportion of said area need be devoted to matrix material so that the device can transfer and reproduce light images with high image resolution.

In a simple embodiment, the image-transfer device of this invention can comprise a multiplicity of light-conducting fibers each embodying a core of a light-transmitting material of relatively high index of refraction having a cladding of light-transmitting material of selected thickness and relatively low index of refraction and can comprise a multiplicity of light-absorbing elements each embodying a filament of light-absorbing material having a cladding of light-transmitting material of approximately said selected thickness. These fibers and elements can be arranged in side-by-side bundled relation so that corresponding opposite ends of the fiber cores cooperate to define respective opposite end faces of the device and so that the light-absorbing elements are dispersed between the fibers. The fibers and elements can then be heated for fusing the fiber and element claddings together to form a single matrix. In this system the cladding of each light-absorbing element can cooperate with the claddings of fibers adjacent to the element to space the light-absorbing filament of the element at a predetermined distance from the cores of the adjacent fibers. Similarly the cladding of each fiber can cooperate with the claddings of adjacent fibers to space the cores of the fibers from each other at a distance which does not substantially exceed the spacing of said cores from an adjacent light-absorbing filament. Preferably the fibers and elements are of a cooperative cross-sectional configuration so that the fibers and elements can fit compactly together before fusing, whereby the fibers and elements can be fused together in vacuum-tight relation without excessively deforming the fibers or elements.

In another embodiment, the device of this invention can comprise a multiplicity of light-conducting fibers each embodying a core for a light-transmitting material of relatively high index of refraction having a cladding of light-transmitting material of relatively low index of refraction and can comprise a multiplicity of filaments of a light-absorbing material. The fibers and filaments can be of cooperative cross-sectional configuration for fitting compactly together in a bundle in specific positional relation to each other. The cladding provided on the fibers can be of a selected thickness at one location extending along the fiber so that, when the fibers and filaments have been arranged in a bundle in said positional relation to each other, the cladding portion of said selected thickness can space each light-absorbing filament at a selected distance from the cores of adjacent fibers in the bundle. The claddings provided at other locations along the fibers can be of a thickness equal to approximately one-half said selected thickness, so that, when the fibers and filaments are arranged in said bundle, these thinner portions of the claddings on two adjacent fibers in the bundle can cooperate to space the cores of said fibers from each other at a distance which does not substantially exceed the spacing of said cores from an adjacent light-absorbing filament. The fibers and filaments can be heated in said bundled relation for fusing the claddings to the filaments and to each other.

In another embodiment the device of this invention can comprise a multiplicity of light-conducting fibers each embodying a core of light-transmitting material of relatively high index of refraction having a cladding of light-transmitting material of relatively low index of refraction, said fibers having a filament of light-absorbing material embedded in and peripherally surrounded by the cladding material. The fiber cladding material can be of a selected thickness at a location between the fiber core and the filament, and can be of a thickness at other locations around the fiber core periphery and around the filament equal to approximately one-half said selected thickness. These fibers can be arranged in side-by-side bundled relation so that corresponding opposite ends of the fiber cores cooperate to define respective opposite end faces of the device and the fibers can be heated for fusing the fiber claddings together. In this system, the thickness of fiber cladding material between the fiber core and filament in each fiber spaces the filament from said fiber core at a selected distance; the thickness of cladding material at other locations around the periphery of the light-absorbing filament can cooperate with the cladding around the core of an adjacent fiber for spacing the filament at approximately said selected distance from said adjacent fiber core, and the thinner portions of the claddings around two adjacents fiber cores con cooperate to space said fiber cores at a distance from each other which also does not substantially exceed said selected distance.

Other objects, advantages and details of the articles and methods provided by this invention appear in the following more detailed description of preferred embodiments of the invention, the description referring to the drawings in which:

FIG. 1 is an end elevation view of a light-conducting optical fiber;

FIG. 2 is a section view along line 2—2 of FIG. 1;

FIG. 3 is an end elevation view of a light-absorbing element;

FIG. 4 is a section view along line 4—4 of FIG. 3;

FIG. 5 is an end elevation view of an assembly of optical fibers and light-absorbing elements illustrating one step in the method of this invention;

FIGS. 10–13 are partial views similar to FIG. 7 illustrating alternative embodiments of this invention;

FIG. 14 is a diagrammatic view illustrating use of the article of this invention as a cathode-ray tube faceplate;

FIG. 15 is an end elevation view of a partially-formed optical fiber provided by the invention, illustrating a step in the manufacture of the fiber;

FIG. 16 is a diagrammatic view illustrating another step in the manufacture of the fiber shown in FIG. 15;

FIG. 17 is an end view of the completed fiber previously shown in partially-completed form in FIG. 15;

FIG. 18 is an end view of a partially formed multi-fiber provided by the invention illustrating a step in the manufacture of the multifiber; and FIG. 19 is an end view of the completed multifiber previously shown in partially-completed form in FIG. 18.

Figure 6:
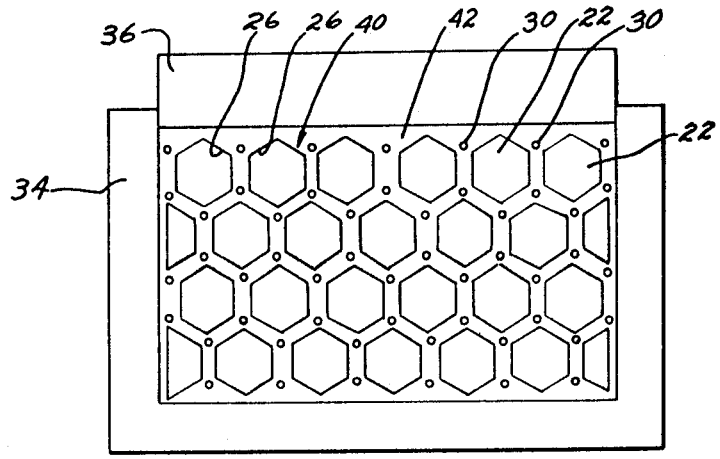
FIG. 6 is an end elevation view similar to FIG. 5 illustrating another step in the method of this invention.

Referring to the drawings, 20 in FIGS. 1 and 2 indicates a light-conducting optical fiber such as can be incorporated in the image-transfer device provided by this invention. As illustrated, the optical fiber can comprise a core part 22 of light-transmitting material of relatively high index of refraction and can be furnished with a cladding 24 of a light-transmitting material of relatively low index of refraction, the fiber core and cladding forming a light-reflecting interface 26 therebetween. In this construction, the fiber is adapted to receive light such as the light ray $b$ therein at one end 20.1 so that the light can be incident upon the fiber interface 26 at an angle $a$ greater than the critical angle of reflection for the interface, whereby the light can be substantially completely reflected from the interface in accordance with well known principles of total internal reflection. This reflected light can be repeatedly reflected from the fiber interface to be conducted through the fiber core to the opposite end 20.2 of the fiber as illustrated in FIG. 2. Other light such as the light ray $c$ can also be received upon the fiber interface 26 at an angle of incidence smaller than the critical angle of reflection for the interface as illustrated in FIG. 2 and part of this light can be transmitted through the fiber interface to escape from the fiber. For example, where the fiber core is formed of flint glass having a refractive index of 1.75 and the fiber cladding is formed of crown glass having a refractive index of 1.52, light rays entering the fiber end 20.1 at an angle of $d$ as great as 60° or more can be totally reflected from the fiber interface 26 to be conducted through the fiber core, this maximum light-acceptance angle $d$ being a function of the relative refractive indices of the core and cladding material as is well known.

It will be understood that light which is conducted through the core of a small optical fiber 20 by repeated reflection from the fiber interface 26 will generally have to be reflected from the interface a great many times, perhaps one thousand times or more, in order to be advanced through the length of the fiber. For this reason, each reflection of light from the fiber interface must be almost one hundred percent efficient in order to avoid excessive, cumulative loss of the light conducted by the fiber. In this regard it must be noted that, although light which is incident upon the fiber interface 26 at angles greater than the critical angle of reflection for the interface is said to be totally reflected from the interface, this light actually penetrates a short distance into the fiber cladding material 24 in being reflected by the interface. This means that at least a minimum thickness of the fiber cladding material must be formed around the fiber core to assure that light penetrating the interface in being reflected is not absorbed or otherwise lost outside the fiber cladding and to assure that the efficiency of each reflection of light from the interface 26 is sufficiently high to avoid an excessive loss of the light conducted by the fiber. For example, considering the separate fiber 20 shown in FIG. 2 as embodying the flint and crown glass materials previously noted, the fiber cladding 24 would require a thickness of approximately one micron in order to form an interface 26 having an effective coefficient of reflectance of approximately unity.

The image-transfer device provided by this invention can also embody light-absorbing elements 28 such as are shown in FIGS. 3 and 4. As illustrated, these light-absorbing elements can each embody a central filament 30 of light-absorbing material and a cladding 32 of light-transmitting material. For clarity of illustration, the filament 30 is shown to be comprised of metal which could absorb approximately one hundred percent of the light incident thereon. However, the filament could be formed of any material having significant light-absorbing properties and preferably would be composed of a material which could be fused and drawn with its cladding. Preferably the filament would be comprised of light-absorbing glass material and would be provided with a cladding 32 of crown glass or other material corresponding to the cladding 24 formed on the fiber 20.

According to this invention, a multiplicity of light-conducting optical fibers 20 and a multiplicity of light-absorbing elements 28 can be assembled in side-by-side bundled relation. For example, the fibers and elements can be arranged within a channel-shaped block 34 with the fibers stacked in parallel relation to each other and with the light-absorbing elements disposed in interstices between the fibers as is shown in FIG. 5. A weight 36, or other compressing means, can then be fitted within the block 34 on top of the bundled fibers and elements and the fibers and elements can be heated to a fusing temperature by any suitable means such as is diagrammatically indicated by the heating coil 38, thereby to compact and fuse the fiber and element claddings together to hold the fibers and elements in bundled relation to form an image-transfer device 40 as shown in FIG. 6. Where the optical fibers and light-absorbing elements are formed of glass as is preferred, the block 34 and the weight 36 are preferably formed of a suitable refractory material which does not tend to stick to the glass as the fibers and elements are heated and fused together.

It should be understood that the fibers 20 and light-absorbing elements 28 are illustrated in FIGS. 5 and 6 as being stacked in bundled relation under somewhat idealized conditions. That is, the optical fibers 20 appear rather large so that only a relatively few fibers are stacked together within the block 34 in forming the device 40. Further, the light-absorbing elements 28 are shown disposed in each interstice formed by the fibers. In actually forming an optical image-transfer device according to this invention, several hundred thousand optical fibers and light-absorbing elements might be assembled in side-by-side bundled relation and not every interstice between the device fibers might be filled with a light-absorbing element. It should also be understood that although the fibers and light-absorbing elements are preferably fused together in side-by-side bundled relation in forming the image-transfer device of this invention, the fibers and elements can be secured or fused together by techniques other than as illustrated in FIGS. 5 and 6 within the scope of this invention.

In the image-transfer device 40 provided by this invention, as shown in FIG. 6, the claddings of the light-conducting fibers 20 and the light-absorbing elements 28 are fused together to form a matrix 42 for securing a large number of the light-conducting fiber cores 22 in spaced side-by-side relation and for securing the light-absorbing filaments 30 at selected locations between the fiber cores. It is an important part of this invention to position the light-absorbing filaments within the matrix 42 for intercepting and absorbing a substantial part of the stray light which may enter the image-transfer device, whereby the device can be adapted to reproduce a light image with proper contrast between light and dark segments of the reproduced image. It is also an important part of this invention to space the fiber cores from the filaments and from other fiber cores so that the filaments do not interfere with light-transmission through the cores and so that each fiber core is adapted to conduct light therethrough with high efficiency, whereby the image-transfer device can reproduce a light image with high light intensities. On the other hand, it is an important part of the invention to limit the proportion of matrix material 42 embodied in the device so that a great number of fiber cores 22 can be incorporated in the device, whereby the device can reproduce a light image with high image resolution.

Figure 7:
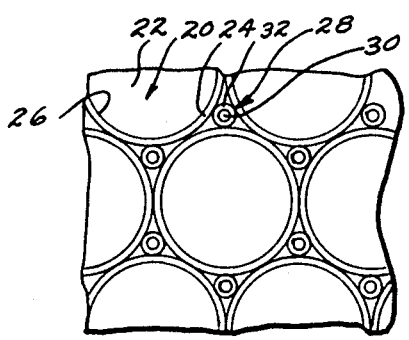
FIG. 7 is a partial view similar to FIG. 5 to enlarged scale.
Figure 8:
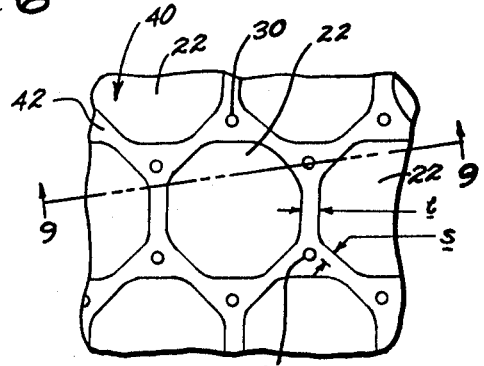
FIG. 8 is a partial view similar to FIG. 6 to enlarged scale.

According to this invention, the optical fibers 20 are provided with claddings 24 of selected thickness and the light-absorbing elements 28 are provided with claddings 32 of approximately the same thickness. Thus, as is illustrated particularly in FIG. 7 which comprises an enlarged partial view of the fibers and elements shown in FIG. 5, the claddings of each two adjacent fibers in the bundle can cooperate to space the interfaces 26 of the two fibers at a predetermined distance from each other. Similarly, the claddings of any optical fiber and an immediately adjacent light-absorbing element can cooperate to space the interface 26 of the fiber at approximately said predetermined distance from the light-absorbing filament 30 of the element. As shown in FIG. 8 which comprises an enlarged partial view of the fused device 40 shown in FIG. 6, these predetermined spacings between adjacent fiber interfaces and between fiber interfaces and adjacent filaments 30 can be retained when the fiber and element claddings have been fused together to form the matrix 42.

Preferably the thicknesses of the fiber and element claddings can be selected so that the spacing s between a fiber interface 26 and an adjacent filament 30 in the completed device 40 can be the minimum sufficient to prevent any substantial absorption by the filament of light which is conducted through the adjacent fiber core by reflection from the interface 26 and so that the spacing t between adjacent fiber interfaces can be approximately the same as the spacing s.

Figure 9:
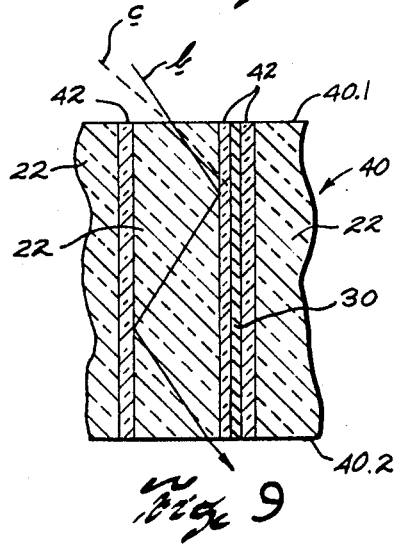
FIG. 9 is a section view along line 9—9 of FIG. 8.

For example, where the fiber core and the fiber and element claddings are formed of the flint and crown glass materials previously suggested, each optical fiber and each light-absorbing element can be provided with a cladding of approximately one-half micron thickness, whereby the spacings s and t in the device 40 would each be approximately one micron. Thus, as shown in FIG. 9, a light ray b entering a fiber core 22 in the image-transfer device 40 at one end 40.1 of the device to be incident upon the fiber interface 26 at an angle greater than the critical angle of reflection for the interface can be repeatedly reflected from the interface to be conducted through the fiber core to the output end face 40.2 of the device. In the first reflection of the light ray b shown in FIG. 9, the reflected light would tend to penetrate into the matrix 42 adjacent to the filament 30 in the course of being reflected. However, the spacing of the interface from the adjacent light-absorbing filament would be approximately one micron so that the light being reflected from the interface would not penetrate the matrix a sufficient distance to be intercepted and absorbed by the filament. Similarly, at the second reflection of the light ray b shown in FIG. 9, the light would again tend to penetrate the matrix material 42. However, the spacing of the reflecting interface 26 from an adjacent fiber interface would also be approximately one micron so that there would be no tendency for the light being reflected to leak into the adjacent fiber core as cross-talk between the fibers. In accordance with this invention, the fiber and element cladding thicknesses need not be selected so that the spacings s and t are exactly the same and, for some purposes, the spacing t may be smaller than the spacing s. However, in order to avoid excessive spacing of the fiber cores 22 in the device 40, the spacing t would never need to substantially exceed the spacing s.

As is also shown in FIG. 9, light such as the light ray c which can enter a fiber core to be incident upon the fiber interface 26 at an angle smaller than the critical angle of reflection for the interface and which therefore can be transmitted through the interface to tend to stray through various device fibers, can be intercepted and absorbed by one or more light-absorbing filaments 30. In this regard it should be understood that stray light such as light ray c may not be intercepted and absorbed by a filament 30 immediately adjacent to the interface 26 upon which the light is first incident. However, the light-absorbing filaments 30 can be dispersed throughout the image-transfer device 40 in such number that a substantial part of this stray light can be intercepted and absorbed by the filaments before the stray light can reach the output end face 40.2 of the device.

The image-transfer device 40 provided by this invention can be employed as a faceplate for a cathode-ray tube 44, for example, as shown in FIG. 14. In this arrangement the image-transfer device can be sealed in vacuum-tight relation to the tube envelope 46 in any conventional manner and can be provided with a layer of phosphors 48 upon the image-receiving, input end face 40.1 of the device. The electron gun 50 of the tube can then direct an electron beam as controlled by the tube deflecting means 52 for exciting the phosphors 48 to form a light image upon the device face 40.1 in conventional manner. The fiber cores 22 embodied in the device 40 can then receive light from respective segments of this light image and can conduct a large part of said light through the cores for reproducing the light image in mosaic form upon the device face 40.2 exteriorly of the cathode-ray tube. The light-absorbing filaments 30 embodied in the device 40 can, of course, absorb a substantial part of any stray light from the original light-image which is not conducted through specific fiber cores 22.

It should be understood that although the light-conducting fibers 20 and light-absorbing elements 28 shown in FIGS. 1–9 have been described as being around in cross-section, the fibers and light-absorbing elements can be of any selected cross-sectional configuration within the scope of this invention. For example, as shown in FIG. 10, which comprises a partial view of a bundle of fibers and elements similar to FIG. 5, an image-transfer device provided by this invention can embody square light-absorbing elements 54, or the like, each having a central filament 56 of light-absorbing material and a cladding 58 of light-transmitting material. Similarly, this image-transfer device can embody a multiplicity of light-conducting fibers 60, each having a core 62 of light-transmitting material of relatively high refractive index and a cladding 64 of light-transmitting material of relatively low refractive index forming a light reflecting interface 65 therebetween, the fibers having suitable cross-sectional configurations for fitting compactly together in a bundle with a number of light-absorbing elements 54. As will be understood, the claddings provided on these fibers and elements can be of a thickness such that the spacing g of a filament 56 from an adjacent fiber core 62 in the bundle is sufficient to prevent any substantial absorption by the filament of light which is conducted through the fiber core and such that the spacing f between adjacent fiber cores 56 in the bundle does not substantially exceed said spacing g. For this purpose, the fiber cladding 64 and the element cladding 58 can be of approximately equal thickness. Of course, the fiber and element claddings can be fused together in the manner described with reference to FIG. 6 for forming an integral image-transfer device.

In another embodiment, the image-transfer device of this invention can embody a multiplicity of square light-absorbing filaments 66 which are not provided with claddings thereon. As shown in FIG. 11 which comprises an end view of a bundle of fibers and light-absorbing elements similar to FIG. 5, these square filaments 66 can be arranged in side-by-side bundled relation with a multiplicity of light-conducting fibers 68 which are of such a cross-sectional configuration as to fit compactly together in the bundle with the filaments 66 in specific positional relation to the filaments. Each fiber 68 can embody a core part 70 of light-transmitting material of high refractive index and a cladding 72 of light-transmitting material of relatively low refractive index for forming a light-reflecting interface 71 therebetween. Each fiber cladding can have portions 72.1 at one location extending along the length of the fiber of selected thickness such that the spacing k of a filament 66 from an adjacent fiber core 70 in the bundle is sufficient to prevent any substantial absorption by the filament of light which is conducted through the core. The fiber cladding can have a portion 72.2 at other locations extending along the fiber of a thickness equal to approximately one-half the thickness of the cladding portion 72.1 such that the spacing $h$ between adjacent fiber cores 70 in the bundle does not substantially exceed said spacing $k$. Of course, the claddings of the fibers 68 can be fused to each other and to the filaments 66 in a manner similar to that described with reference to FIG. 6 for forming an integral image-transfer device.

In another embodiment the image-transfer device of this invention can embody a multiplicity of light-conducting optical fibers 74. As shown in FIG. 12, which comprises an end view of a bundle of fibers 74 otherwise similar to the bundle of fibers shown in FIG. 5, each optical fiber 74 can embody a core part 76 of light-transmitting material of relatively high index of refraction, a light-absorbing filament 78, and a cladding 80 of light-transmitting material of relatively low index of refraction. The cladding material can form a light-reflecting interface 81 around the periphery of the fiber core 76, and the filament 78 can be imbedded in and peripherally surrounded by the cladding. According to this invention, the fiber cladding can have a selected thickness $p$ at one location 80.1 between the fiber core 76 and the light-absorbing filament 78 which is preferably sufficient to prevent any substantial absorption by the filament of light which is conducted through the fiber core 76 by reflection from the interface 81. The fiber cladding can also be of a thickness equal to approximately one-half said selected thickness at a location 80.2 around the periphery of the filament 78 such that the cladding portion 80.2 can cooperate with the cladding of an adjacent fiber in the bundle for spacing the filament at a spacing $n$ from the adjacent fiber core, this spacing $n$ being approximately equal to the spacing $p$. Similarly, the fiber cladding can have portions 80.3 around the periphery of the fiber core 76 of a thickness equal to approximately one-half said selected thickness such that the cladding portions 80.3 can cooperate with the cladding of an adjacent fiber in the bundle for spacing the fiber core 76 at a spacing $m$ from the adjacent fiber core, the spacing $m$ also being approximately equal to the spacing $p$. Of course, the claddings of the fiber 74 can be fused together in a manner similar to that illustrated in FIG. 6 for forming an integral image-transfer device.

In forming image-transfer devices according to this invention in the manner illustrated in FIGS. 5 and 10–12 inclusive, the light-conducting fibers which are arranged in side-by-side relation to form a bundle are substantially identical. However, all light-conducting fibers embodied in the device of this invention need not be exactly the same. Thus, as shown in FIG. 13, a plurality of light-conducting optical fibers 74 such as were described with reference to FIG. 12 can be assembled in side-by-side bundled relation with a plurality of optical fibers 82 of a different character. The fibers 82 can each embody a core part 84 of a light-transmitting material of relatively high index of refraction and a cladding 86 of light-transmitting material of relatively low index of refraction, the cladding 86 being of a thickness approximately equal to the thickness of the cladding portions 80.2 and 80.3 on the fibers 74. A selected number of the fibers 74 embodying light-absorbing filaments 78 can be interspersed in the bundle with the fibers 82 and the claddings of the fibers can be fused together in the manner illustrated in FIG. 6 for forming an integral image-transfer device. In this arrangement, any desired number of light-absorbing filaments 78 can be located in the image-transfer device for absorbing stray light. The filaments can be interspersed through the device for absorbing any desired proportion of the stray light which may be transmitted through the device and each filament can be very conveniently spaced at the desired distances from adjacent fiber cores in the device.

FIGS. 15–17 inclusive illustrate a method for forming light-conducting fibers such as the fibers 74 having integral light-absorbing filaments embodied therein. FIGS. 15–17 show the formation of square fibers 88 to illustrate that such fibers can be of any desired cross-sectional shape and it will be understood that the hexagonal fibers 74 or fibers of other shapes can be formed in a similar manner. According to this invention, a core part 90 of light-transmitting material of relatively high index of refraction can be surrounded by a light-transmitting material of relatively low index of refraction as by placing the core part within the tube 92. A filament 94 of light-absorbing material can also be disposed within the tube 92 and a spacer 96 of light-transmitting material, preferably the same as that embodied in the tube 92, can be fitted within the tube between the core part and the filament. If desired, additional spacers 98, also preferably of the same material as the tube 92, can be fitted inside the tube between the tube and the filament 94. One end 92.1 of the tube can then be fitted within a sleeve 100 which can be clamped in a supporting bracket 102 in a fiber drawing apparatus as shown diagrammatically in FIG. 16. Clamping of the sleeve 100 can serve to preliminarily hold the core part, spacers and filament within the tube 92 but preferably these members can be retained in the tube with an adhesive 104 or by fusing the members together or by other suitable means as will be understood.

The bracket 102 can be threadedly mounted on a lead screw 106 which is rotatably mounted on supports 108 and is rotatably driven by the motor 110 and pulley arrangement 112 for progressively lowering the tube 92 at a selected rate through a heating zone 114. The heating zone can be formed by means of an electric heating coil 116 mounted in a ceramic support 118, or the like, or by other suitable heating means but should be capable of heating the material of the tube 92 and of the members therein to a fusing and drawing temperature as they are advanced into the heating zone. As will be understood, the depending ends of the tube 92 and other members therein can be heat-softened at said fusing and drawing temperature so that the tube and members can be fused together and simultaneously drawn in the direction of the arrow 120 at a relatively rapid rate, thereby to elongate and proportionately reduce the cross-sectional size of the tube and members to form an integral light-conducting fiber. As the drawn fiber cools beneath the heating zone 114, the fiber can be cut into lengths 88 by any conventional means such as the cutting tool 122. As shown in FIG. 17, which comprises an enlarged end view of the fiber 88, the material of the tube 92 and the spacers 96 and 98 can be fused together to form an integral cladding 124 around the core part 90 and the filament 94 and to form a light-reflecting interface 126 around the periphery of the core part. As will be understood, the thickness of the original tube and spacers can be selected so that the cladding portion 124.1 in the fiber 88 can have a thickness $v$ sufficient to prevent absorption by the filament 94 of light conducted through the core part 90 and so that the thickness $x$ of the cladding portion 124.2 can be equal to approximately one-half the thickness $v$. Where spacers 98 are employed in forming the fiber 88, the thickness $y$ of the cladding portion 124.3 can be slightly larger than the thickness $x$ but according to the invention should still be substantially less than the thickness $v$. Where the spacers 98 are omitted in forming the fiber 88, the thickness $y$ can equal the thickness $x$. As will be understood, the fibers can be arranged in side-by-side bundled relation and can be fused together for forming an integral image-transfer device in a manner similar to that shown in FIGS. 5 and 6.

In arranging light-conducting fibers in side-by-side bundled relation in the manner illustrated in FIGS. 5 and 10–13 inclusive, individual light-conducting fibers are stacked together to form a bundle which can be fused for forming an image-transfer device. However, as these individual light-conducting fibers are preferably on the order of 50 microns or less in diameter or transverse dimension, it will frequently be desirable to assemble the fibers preliminarily in the form of multifiber units which can be further assembled in a relatively large bundle for forming an image-transfer device. For this purpose, as shown in FIG. 18, a plurality of light-conducting fibers 88 can be assembled in side-by-side bundled relation with other light-conducting fibers 128, these other fibers having core parts 130 and claddings 132 as will be understood. This bundle of fibers can be secured together as by use of a tape 133 and the taped bundle can be progressively heat-softened and drawn out in the apparatus of FIG. 16 for fusing the fibers 88 and 128 together to form a multifiber 134. As this taped bundle of fibers can be fused, drawn and cut to form a multifiber in the apparatus illustrated in FIG. 16 in a manner similar to that described with reference to the formation of the individual fibers 88, this procedure will not be further described herein and it will be understood that, as the fibers are drawn, the claddings of the fibers 88 and 128 can be fused together to form a matrix or cladding 136 as shown in FIG. 19. As will be understood, FIG. 19 comprises an end view of a multifiber unit 134 which can be formed from the taped bundle of fibers shown in FIG. 18. The thicknesses of the claddings on the fibers 88 and 128 can, of course, be controlled so that the spacings between adjacent fiber cores 90 and 130, and between fiber cores and adjacent light-absorbing filaments 94 in the multifiber 134, can be related in the manner previously described.

It will be understood that similar multifibers of any desired cross-sectional configuration can be formed in a similar manner using various combinations of the individual light-conducting fibers and light-absorbing elements previously described. It will also be understood that these multifibers can be of relatively large cross-sectional dimension on the order of 0.060 inches, or more, so that a plurality of the multifibers can be conveniently assembled in side-by-side bundled relation and can be fused together for forming an integral image-transfer device in a manner similar to that illustrated in FIGS. 5 and 6.

Although particular embodiments of the image-transfer devices and of the methods of making said devices according to this invention have been described herein for the purpose of illustration, it must be understood that this invention includes all modifications and equivalents thereof which fall within the scope of the appended claims.

I claim:
1. An image-transfer device formed of a multiplicity of optical fibers of highly light-transmissive material having one index of refraction, a number of elements of material having significant light-absorbing properties interspersed between said fibers and a matrix of highly light-transmissive material having a lower index of refraction than that of said fibers, said fibers and elements being secured together in spaced side-by-side relationship as a bundle by said matrix material so that each fiber forms a light-reflecting interface with said matrix rendering the fiber conductive to light from end to end by repeated internal reflection from said interface wherein the improvement comprises:

said matrix material being of substantially the minimum thickness required between respectively adjacent fibers for providing said light-reflecting interfaces and the thickness of said matrix material between each fiber and any adjacent light-absorbing element being substantially equal to that between said adjacent fibers.

2. An image-transfer device as recited in claim 1 wherein said optical fibers, elements and matrix are all formed of glass and fused together.

3. An image transfer device formed of a multiplicity of optical fibers arranged in side-by-side relationship wherein each fiber comprises a core of light-transmitting material of relatively high index of refraction and a cladding of a light-transmitting material of relatively low index of refraction formed around the periphery of said core, said fiber core and cladding forming a light-reflecting interface therebetween so that light received within the fiber core at one end to be incident upon said interface at angles greater than the critical angle of reflection for said interface can be reflected from said interface to be conducted through the fiber core and so that light received within the fiber core at one end to be incident upon said interface at angles smaller than the critical angle of reflection for said interface can be transmitted through the interface, said fiber having at least one filament of a material having significant light-absorbing properties embedded in and peripherally surrounded by said fiber cladding material, said cladding material being of a minimum thickness at a location between said light-absorbing filament and said fiber interface sufficient for avoiding any substantial absorption by said filament of light which is conducted through said fiber core by reflection from said interface, said cladding material being of a thickness at other locations around the fiber periphery and around said light-absorbing filament equal to approximately one-half the thickness of said cladding material between said filament and said fiber interface and said fibers all being fused together to form a unitary device.

References Cited

UNITED STATES PATENTS

| | | | |
|---|---|---|---|
| 3,141,106 | 7/1964 | Kapany | 350—96 X |
| 3,240,987 | 3/1966 | Hicks | 350—96 X |
| 3,247,756 | 4/1966 | Siegmund | 88—1 |
| 3,253,500 | 5/1966 | Hicks | 88—1 |

DAVID H. RUBIN, *Primary Examiner.*

R. J. STERN, *Assistant Examiner.*